(12) United States Patent
Luetze et al.

(10) Patent No.: US 7,276,807 B2
(45) Date of Patent: Oct. 2, 2007

(54) WIND TURBINE DUMP LOAD SYSTEM AND METHOD

(75) Inventors: Henning Luetze, Bad Bentheim (DE); Thomas Edenfeld, Osnabruck (DE); Peter Gauchel, Munster (DE)

(73) Assignee: General Electric Company, Schenectady, NY (US)

( * ) Notice: Subject to any disclaimer, the term of this patent is extended or adjusted under 35 U.S.C. 154(b) by 51 days.

(21) Appl. No.: 11/334,575

(22) Filed: Jan. 19, 2006

(65) Prior Publication Data
US 2007/0164567 A1    Jul. 19, 2007

(51) Int. Cl.
*H02P 9/00* (2006.01)

(52) U.S. Cl. .............................. 290/44; 290/55; 322/37

(58) Field of Classification Search ................. 290/43, 290/44, 54, 55; 322/19, 35, 37; 307/72, 307/64, 75
See application file for complete search history.

(56) References Cited

U.S. PATENT DOCUMENTS

| | | | |
|---|---|---|---|
| 4,355,955 A | | 10/1982 | Kisovec |
| 4,357,542 A | | 11/1982 | Kirschbaum |
| 4,435,646 A | | 3/1984 | Coleman et al. |
| 4,490,093 A | | 12/1984 | Chertok et al. |
| 4,511,807 A | * | 4/1985 | Somerville .................... 290/44 |
| 5,536,976 A | * | 7/1996 | Churchill .................... 307/11 |
| 5,786,642 A | * | 7/1998 | Wilhelm .................... 307/72 |
| 5,907,192 A | * | 5/1999 | Lyons et al. .................... 290/44 |
| 5,929,538 A | * | 7/1999 | O'Sullivan et al. ........... 307/66 |
| 6,566,764 B2 | * | 5/2003 | Rebsdorf et al. ............. 290/44 |
| 6,774,608 B2 | * | 8/2004 | Hofstetter et al. ............ 322/24 |
| 6,856,038 B2 | * | 2/2005 | Rebsdorf et al. ............. 290/44 |
| 6,856,041 B2 | * | 2/2005 | Siebenthaler et al. ......... 290/44 |
| 6,924,565 B2 | | 8/2005 | Wilkins et al. |
| 7,102,247 B2 | * | 9/2006 | Feddersen .................... 290/44 |
| 2002/0079706 A1 | | 6/2002 | Rebsdorf et al. |
| 2004/0222642 A1 | | 11/2004 | Siebenthaler et al. |
| 2004/0264082 A1 | | 12/2004 | Suliman et al. |
| 2005/0040655 A1 | | 2/2005 | Wilkins et al. |

OTHER PUBLICATIONS

Bhim Singh et al, "Solid State Controllers For Asynchronous Generators", pp. 1-8. (India International Conference on Power Electronics 2004).
"System 2 - Specifications", http://wwwphys.murdoch.edu.au/WebRAPS/specifications/systems2.htm, Nov. 28, 2005, 3 pages.
"Abundant Renewable Energy", Harness the Wind, ARE Wind Turbines, http://www.abundantre.com/ARE_Wind_Turbines.htm, Nov. 28, 2005, 5 pages.
"Whisper H40 and H80 Wind Turbines", http://www.energyoutfitters.com/products/wind/Whisper.shtm, Nov. 28, 2005, 3 pages.

(Continued)

*Primary Examiner*—Nicholas Ponomarenko
(74) *Attorney, Agent, or Firm*—Nixon & Vanderhye P.C.

(57) ABSTRACT

A wind turbine braking system including: a wind turbine including turbine blades and a control system; a generator coupled to the turbine blades; a generator converter coupled to the generator and connectable to a utility power grid; at least one dump resistor coupled to the generator and generator converter, and if the utility power grid losses power, the dump resistor applying an electrical load to the generator converter.

20 Claims, 4 Drawing Sheets

OTHER PUBLICATIONS

"AWP3.6 Wind Generator", Owners Manual Version 3.0, AWP_Owner's Manual - Sep. 2004.doc, pp. 1-16.

"KestreL 600 Wind Turbine", http://www.kestrelwind.co.za/Kestrel600.htm, Nov. 28, 2005, 7 pages.

* cited by examiner

WIND TURBINE DUMP LOAD SYSTEM AND METHOD

BACKGROUND OF THE INVENTION

The invention relates to the generation and distribution of electric power generated by wind turbines. More particularly, the invention relates to adapting to rapid losses of electrical power loads on a wind turbine, such as the loss of an electrical power grid load.

Power transmission and distribution grids ("power grids") transmit electrical energy from wind turbine generating facilities to electrical power customers. The power grid provides an electrical load for a wind turbine generator. The electrical load on the generator imposes a torque on the rotor of the generator. The rotor is turned by the wind turbine which in turn is rotated by the wind. The torque on the rotor from the grid load results in a torque applied to the wind turbine. The wind turbine is balanced based on the torque from the grid load. If the grid load is loss the wind turbine may become unbalanced.

Loss of the grid unloads the generator and typically results in a rapid loss of a torque load on the generator. This rapid loss of torque can lead to a dramatic and rapid acceleration of the wind turbine rotor. To avoid over speeding of the rotor a severe braking procedure has to be initiated, leading to high load forces and moments acting on the wind turbine structure, such as large bending moments being applied to the tower of a wind turbine.

Wind turbines are traditionally designed to withstand the forces resulting from a grid loss. For example, towers for wind turbines have thick walls and large connection bolts to, in part, withstand large bending moments resulting from an abrupt grid loss. The base for a wind turbine is traditionally designed to adsorb the forces applied to the tower by a loss of grid load. There is a long felt need for structures and methods that accommodate grid loss without applying large forces to the wind turbine.

BRIEF DESCRIPTION OF THE INVENTION

A dump load resistor is included in the power circuit of a wind turbine. When a grid loss occurs, the dump load resistor immediately applies an electrically adsorbing load to the generator and thereby avoids excessively unloading the generator and wind turbine. The dump load resistor applies a load to the generator for at least a few seconds until the speed of the rotor is reduced, e.g., by blade pitching. This procedure avoids a heavy acceleration of the rotor. Other energy storage devices, e.g., a fly wheel, can also be used.

The dump load resistor avoids the rapid increase in rotor speed leading to a severe braking procedure that again lead to large and rapid forces, e.g., a bending moment, applied to wind turbines when a grid loss occurs. The dump load resistor allows the wind turbine to be designed to withstand much smaller grid loss loads that is required of typical wind turbine designs.

In one embodiment, the invention comprises a wind turbine system including: a wind turbine including turbine blades and a control system; a generator coupled to the turbine blades; a generator converter coupled to the generator and connectable to a utility power grid; at least one dump resistor coupled to the generator and generator converter, the dump resistor applying an electrical load to the wind turbine generator; if and when the utility power grid looses power.

In another embodiment, the invention is a wind turbine energy load system comprising: a connector adapted to couple a wind turbine generator and a generator converter, and a dump load resistor coupled in parallel to the connector.

In a further embodiment, the invention is a method for loading a wind turbine coupled to a utility power grid, the method comprising: applying a dump load resistor to the wind turbine upon loss of power from the utility power grid, and dissipating power from rotational inertia of the wind turbine to the dump resistor via a generator and a generator converter.

DETAILED DESCRIPTION OF THE INVENTION

Figure 1:
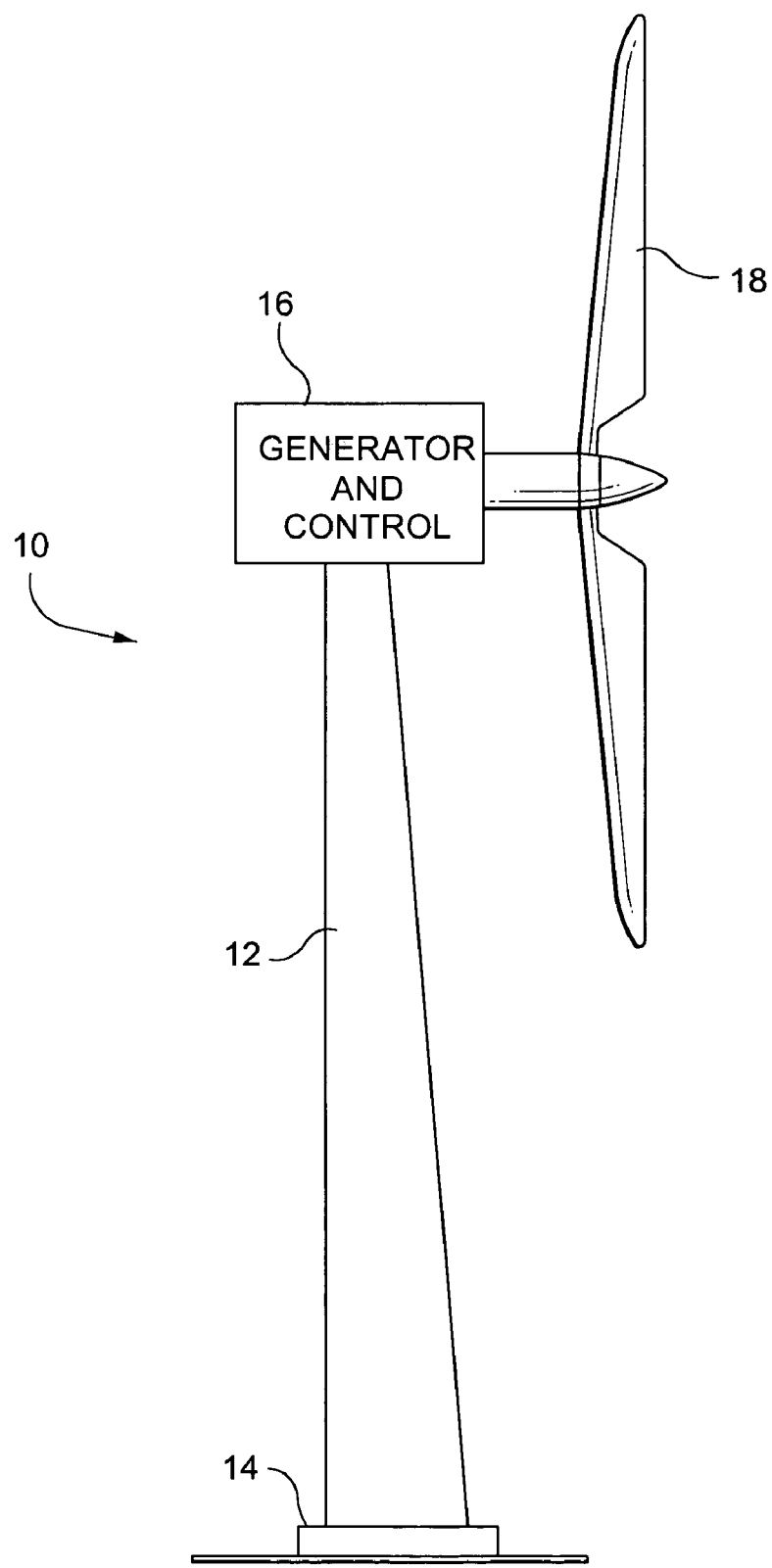
FIG. 1 is a schematic diagram of a wind turbine having a dump load resistor

FIG. 1 is a schematic view of a wind turbine system 10. The wind turbine may include a tower 12 mounted on a base 14 and capped with a wind turbine 16 having a plurality of large blades 18. Wind turns the blades which drive the generator. The pitch of the blades of the wind turbine may be adjusted by a conventional gearing device.

Figure 2:
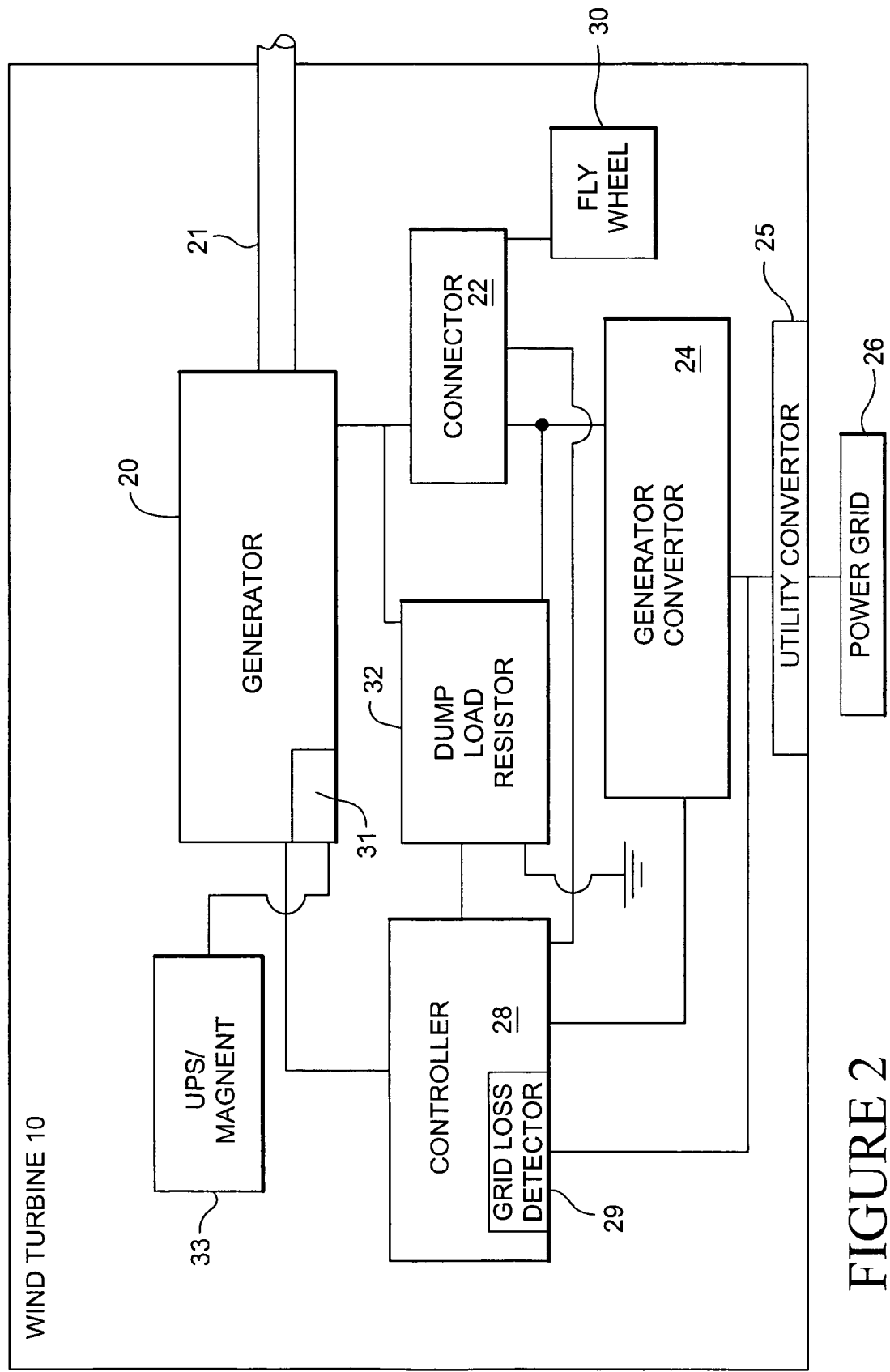
FIG. 2 is a block diagram of electrical components of the wind turbine.

FIG. 2 is a high level block diagram of certain components of the wind turbine 10. The generator 20 includes a rotor that is rotationally driven by a shaft 21 turned by the blades of the wind turbine. Electrical power from the generator is transferred through a connector 22 to a generator converter 24. The generator converter 24 may be coupled to a utility grid power converter 25 that is in turn coupled to a power grid 26 is a conventional manner. The utility grid power converter may be mounted on the ground near the wind turbine base 14 and serve one or more wind turbines 10.

The exciter 31 for the rotor of the generator may be driven by an uninterruptible power supply (UPS) 33, to ensure that the exciter is powered during a grid power loss. Alternatively, the generator may be a permanent magnet generator (PMG) which does not require a powered exciter.

A controller 28 monitors and controls the wind turbine. The controller includes a grid loss detector 29 that monitors the power grid 26 and detects when a power loss occurs on the grid. A power loss may be indicated by an undervoltage condition in the grid or an out of frequency condition in the grid. A power loss rapidly reduces the power load on the generator and on the wind turbine. When a grid loss is detected, the controller switches the connector 22 to couple the dump load resistor 32 to the generator 20 and generator converter 24. The controller may also command the gearing of the wind turbine to adjust the blade pitch so as to reduce the rotational speed of the wind turbine. Further, the controller may activate the connector 22 to couple to the generator. Another energy storage load 30, such as a fly wheel, battery or other storage device. Connecting the dump load resistor occurs fast, e.g., within 0.1 to 1 second.

Adjusting blade pitch and/or coupling another storage device is relatively slow, e.g., 3 seconds to several minutes.

The dump load resistor is connected to the connector 22. The dump load resistor may be arranged in parallel to the converter and connected to an output of the generator.

Figure 3:
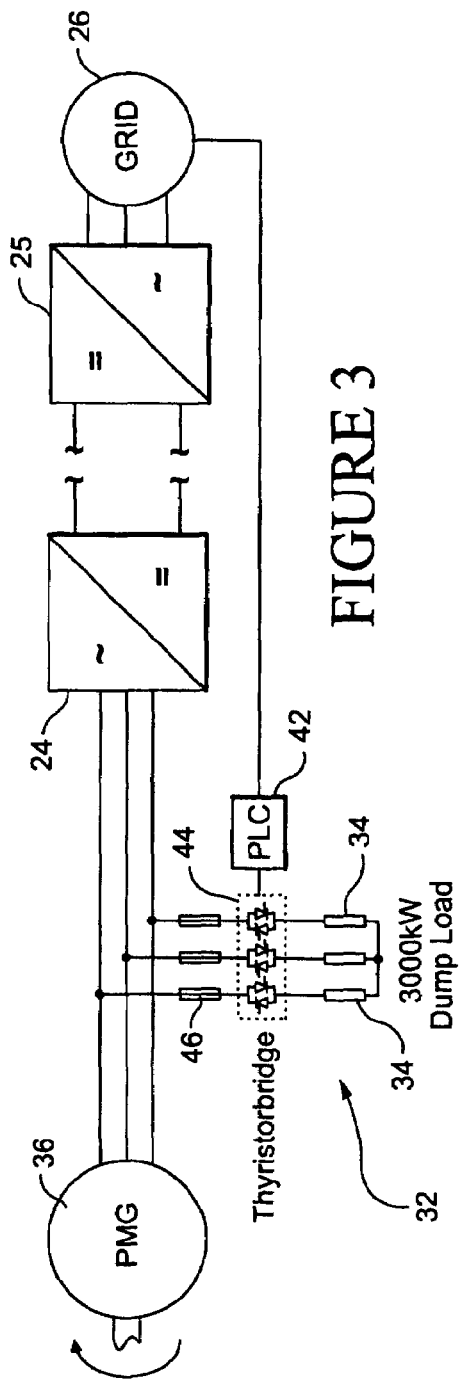
FIG. 3 is a schematic electrical diagram of the dump load resistor formed of a bank of resistors, and associated control circuits.

FIG. 3 is a schematic diagram of the generator, converters, grid, dump load resistor 32 and the control circuits for the dump load resistor. The dump load resistor dissipates the power produced by the generator 20. Examples of dump load resistors are resistance wires wound around solid heat sinks, resistance elements in a water or other liquid heat sink or other heat dissipation device. The dump load resistor has a resistance comparable to the load applied to the generator 20 by the power grid. For example, the dump load resistor may have a rated capacity to adsorb power in the range of 1,000 to 4,000 kilo Watts (kW) and more preferably about 3,000 kW.

The dump load resistor 32 shown in FIG. 3 is embodied as a 1,000 kW rated resistor 34 for each phase of a three-phase power output of a permanent magnet generator (PMG) 36 that is driven by a wind turbine. While the power grid 26 is connected, power from the PMG is transferred through a conventional full size generator converter 34 and a conventional full size grid converter 25 to convert the three-phase power from the PMG to three-phase power having the phasing, voltage and current suitable for the power grid 26.

A programmable logic circuit (PLC) 42, which may be the controller for the wind turbine, monitors the connection to the grid and detects a loss of the grid power load. When a grid loss is detected, the PLC switches a thyristor bridge 44 to connect each of the dump load resistors 34 to one of the phases of the power output from the PMG 36. The dump load resistors dissipate power from the PMG until the grid load is reconnected to the converters 38, 40, the wind turbine blade speed is reduced, or until an energy storage device (not shown in FIG. 3) is connected to the PMG and/or converters. Impedance devices 46, e.g., filters and/or inductors, match the dump load resistor 32 to the three-phase output of the generator 36.

Figure 4:
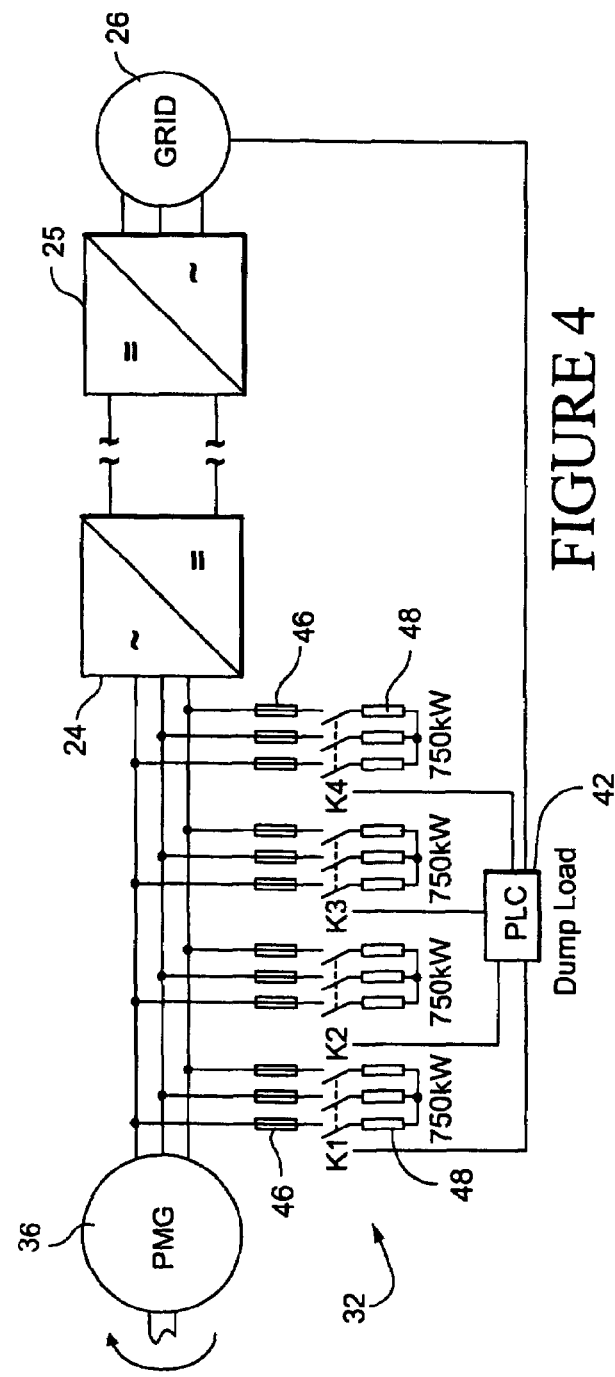
FIG. 4 is a schematic electrical diagram of the dump load resistor formed of a bank of resistors, and associated control circuits.

As shown in FIG. 4, the dump load of resistor 32 may be multiple banks of resistors 48 arranged in parallel. Each resistor bank 48 may be a set of three 750 kW rated resistors for each phase of the PMG output. The PLC controls when and which, if any, of the resistor banks 48 are connected to the PMG output. The total resistance of the bank of resistors may be controlled in real time or near real time, by the PLC 42 to be the same as or comparable to the load being applied to the generator by generator converter as a result of the grid load. For example, if all resistor banks 48 are applied to the PMG output, the total dump resistor load would be rated to dispute 3,000 kW, assuming four resistor banks and each bank is formed of 750 kW rated resistors. The PLC may apply one, two or three (but less than all) of the resistor banks 48 to apply a partial dump load to the PMG in the event that the grid load falls below predetermined load levels. For example, the PLC may successively apply resistor banks to progressively increase the dump load as the grid load falls off towards total grid loss. The successive application of resistor banks allows a relatively smooth and gradual application of a dump resistor load.

Figure 5:
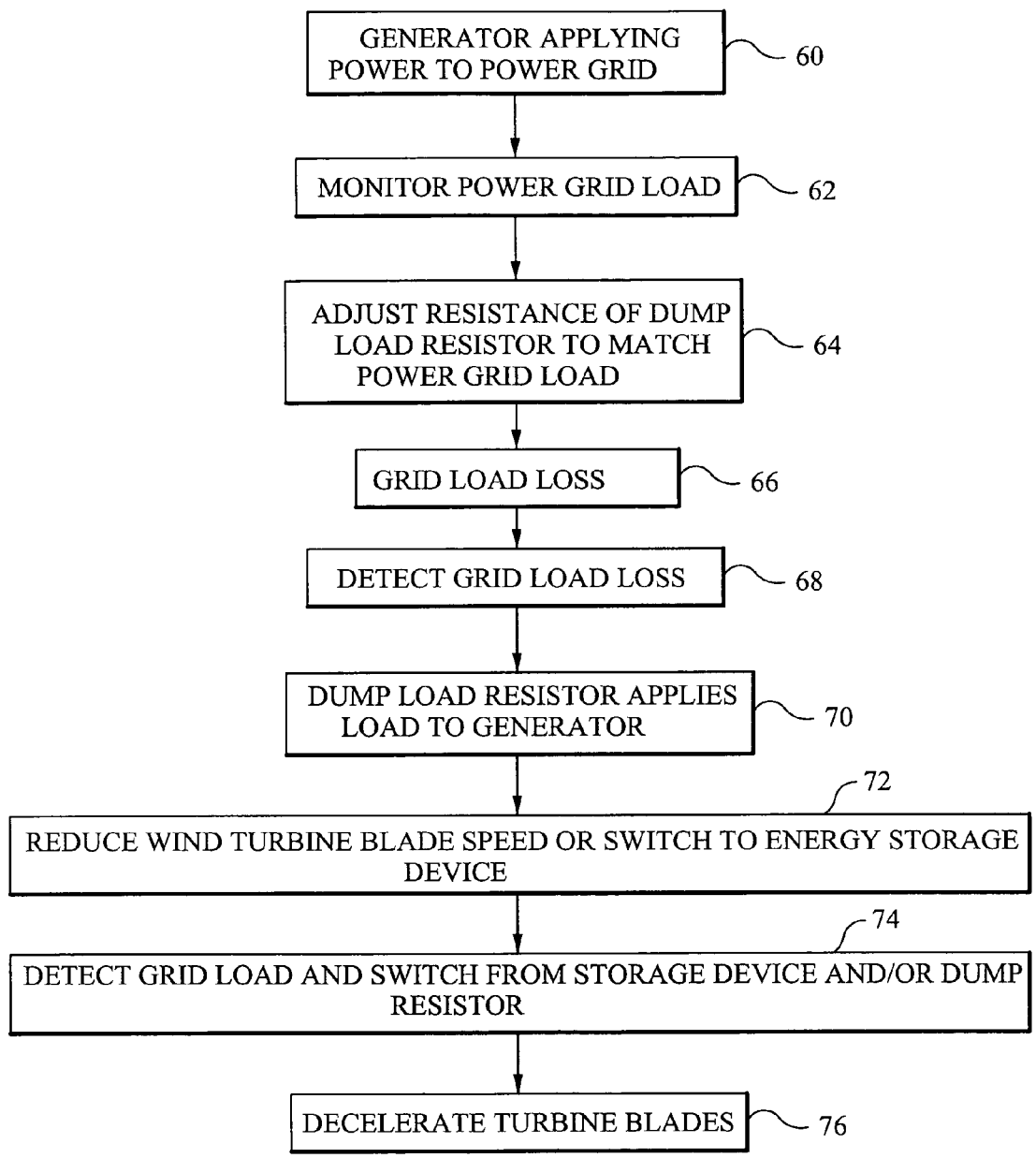
FIG. 5 is a flow chart of a grid loss procedure for a wind turbine.

FIG. 5 is an exemplary flow chart of a procedure for adjusting to a grid power loss. In step 60, the wind turbine 10 generates power applied to the power grid 26 (FIG. 2). In particular, power produced by the generator is applied to the generator converter which transforms the power to a frequency, phasing and voltage level(s) suitable for use on the power grid. This transformation may be performed by a combination of the generator converter and utility power grid converter 25 (FIG. 2).

The controller 28, and particularly the grid loss detector 29, monitors the power grid 26 such as by monitoring the frequency, phase and voltage levels on the connection between the converters 24 and/or 26 and the power grid 26. The controller 28 adjust the total resistance of the dump load resistor 32 to match the load applied by the power grid. The controller may delay the adjustment of the controller, e.g., by a minute, an hour or a day, to ensure that the resistor is not adjusted after a grid loss is detected.

A grid loss occurs, in step 66, such as by a sudden change in the frequency, phase or voltage levels in the load applied by the grid to the converters 24, 25. The controller 28 is programmed to determine that a grid loss has occurred when a predetermined condition arises, such as a sudden change in the frequency, phase or voltage levels in the load applied by the grid. The predetermined condition may indicate that a grid loss is imminent and need not be full loss of the grid load.

In step 68, the grid loss detector 29 detects the predetermined condition stored in the controller and the controller determines that a grid loss condition exists. Upon detecting a grid loss, the dump load resistor is substantially immediately, e.g., within 0.1 to 1 second, switched to be a load on the generator in step 70. The dump load resistor is switched to be a load on the generator quickly so that no substantial forces are applied to the wind turbine as a result of the grid loss, including the application of excessive bending moments to the tower. The dump load can be switch to be a load for the generator substantially immediately and possibly before the grid load is fully lost.

The controller may also reduce the wind turbine blade speed and/or switch to an energy storage device, in step 72. Adjusting the rotational speed of the turbine generally requires several minutes. An energy storage device may be a fly wheel 72, for example, on the ground near the base of the wind turbine may store energy generated by the wind turbine so that it may be later reused. The dump load resistor may be configured so that energy is dissipated and not stored. However, relatively slow electromechanical switches, e.g., relays, may connect the fly wheel to the connector 22. During the delay in activating these relays, the dump load resistor 32 applies a load to the generator and thereby avoids applying excessive forces, e.g., torques and bending moments, to the wind turbine. In step 74, the blades of the wind turbine may also be decelerated or feathered in response to a grid load power loss.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A wind turbine system comprising:
    a wind turbine including turbine blades and a control system;
    a generator coupled to the turbine blades;
    a generator converter coupled to the generator and connectable to a utility power grid;
    at least one dump resistor coupled to the generator and generator converter, and
    if the utility power grid losses power, the dump resistor applies an electrical load to the generator converter.

2. The system of claim 1, wherein the at least one dump resistor further comprises a bank of multiple resistors and a thyristor bridge to switchably connect the bank to the generator and generator converter.

3. The system of claim 1 wherein the at least one dump resistor further comprises a plurality of banks of multiple resistors connected in parallel, wherein one or more of the banks are switchably connected to the generator and generator converter.

4. The system of claim 1 wherein the dump resistor is connected to the generator and in parallel with a connector for the generator and the generator converter.

5. The system of claim 1 where in the dump resistor is a plurality of dump resistors.

6. The system of claim 1 wherein the utility power grid includes main contactors, and wherein the control system is applied to detect a loss of power in the utility power grid by sensing an undervoltage or out of frequency condition.

7. A wind turbine energy dissipation system comprising:
  a connector adapted to couple a wind turbine generator and a generator converter;
  a dump load resistor coupled to the connector, and
  a grid loss detector configured to command the connector to couple the dump load resistor to the generator in the event of a grid loss.

8. The wind turbine energy dissipation system of claim 7 wherein the dump load resistor is in parallel to the connector and is coupled to the generator and generator converter.

9. The wind turbine energy dissipation system of claim 7 wherein the dump load resistor is a plurality of dump load resistors.

10. The wind turbine energy dissipation system of claim 7 wherein the grid loss detector is a programmable logic circuit and the connector is a thyristor bridge switch.

11. The wind turbine energy dissipation system of claim 7 further comprising an energy storage device also connected to the generator in the event of the grid loss.

12. The wind turbine energy dissipation system of claim 7 wherein the grid loss detector detects a loss of power in the utility power grid by sensing an undervoltage or out of frequency condition.

13. The wind turbine energy dissipation system of claim 7 wherein the dump load resistor is permanently connected to the connector.

14. A method for a wind turbine coupled to a utility power grid, the method comprising:
  applying a dump load resistor to the wind turbine upon loss of power from the utility power grid;
  sensing a grid loss condition, and
  upon sensing the gird loss condition, dissipating power from rotational inertia of the wind turbine to the dump resistor via a generator and a generator converter.

15. The method of claim 14 further comprising applying the dump resistor load by arranging the dump load resistor in parallel with a connection of the generator and generator converter.

16. The method of claim 14 further comprising progressively increasing a resistance load of the dump load resistor by successively connecting resistors to the generator.

17. The method of claim 15 wherein the load is switched to the dump load resistor within 0.1 seconds of detecting the grid loss.

18. The method of claim 15 further comprising decelerating the wind turbine upon detecting a grid loss.

19. The method of claim 18 wherein the dump load resistor is applied immediately upon grid loss and is continuously applied at least until a rotational speed of the wind turbine is reduced.

20. The method of claim 15 wherein the grid loss is sensed by detecting an undervoltage condition or an out of frequency condition in the grid.

* * * * *